UNITED STATES PATENT OFFICE.

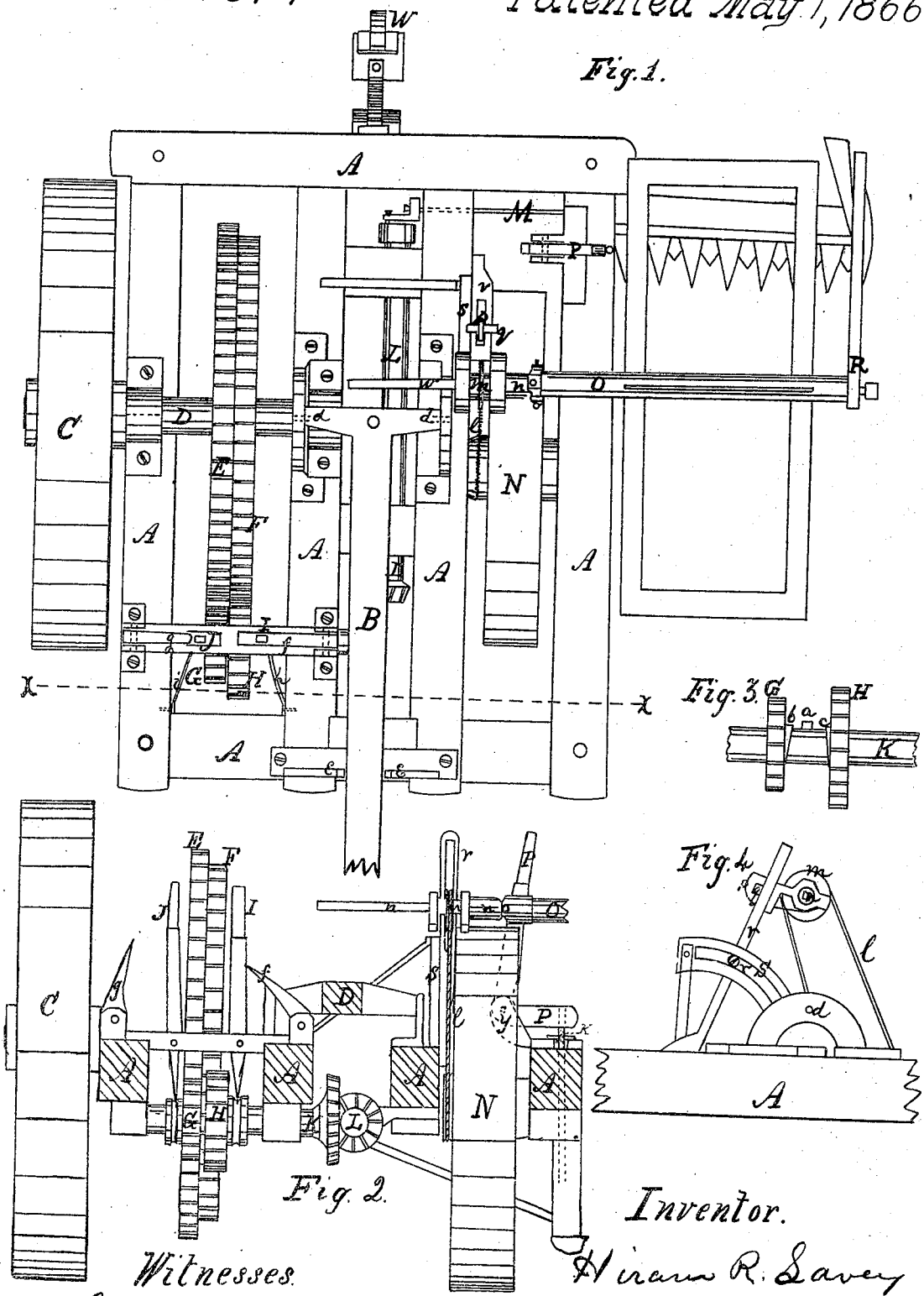

HIRAM R. LAVEY, OF BRISTOL, WISCONSIN.

IMPROVEMENT IN REAPING AND MOWING MACHINES.

Specification forming part of Letters Patent No. 54,374, dated May 1, 1866.

*To all whom it may concern:*

Be it known that I, HIRAM R. LAVEY, of Bristol, in the county of Kenosha and State of Wisconsin, have invented a new and useful Improvement in Combined Reaper and Mower; and I do hereby declare that the following is a full, clear, and exact description of the same, reference being had to the accompanying drawings, and the letters and figures marked thereon, which form part of this specification.

In machines of this class it is necessary to the perfect operation of the same that the sickle should have a more rapid reciprocating movement when used for mowing grass than when used for harvesting grain.

My invention therefore consists in a novel arrangement whereby the desired variation in the motion of the sickle is readily and easily secured; and also in a novel arrangement whereby the position of the reel may be varied and adjusted.

To enable those skilled in the art to understand how to construct and use my invention, I will proceed to describe the same with particularity, making reference in so doing to the aforesaid drawings, in which—

Figure 1 represents a plan or top view of my invention; Fig. 2, a front-end view of the same in section at the line $x$ in Fig. 1. Fig. 3 is a detached view of the spur-wheels G and H, with their attachments, &c. Fig. 4 shows a side view of the arrangement for adjusting the reel.

The same letters of reference in the different figures denote the same parts of my invention.

A represents the frame of the machine, and B the draft-pole or tongue thereof, which is pivoted at its rear end, as shown, by the pivot-bolts $d\ d$, and has a vertical motion about the same, being held in position by the vertical guides $e\ e$ upon the front of the frame.

C represents the drive-wheel, which, by means of the intermediate gearing operates the sickle, N representing the other wheel of the machine, which propels the reel.

D represents the shaft of the driving-wheel C, supported in suitable bearings upon the frame, upon which shaft are fixed rigidly the gear-wheels E and F, one being larger than the other, in the proportions and for the purposes hereinafter specified.

The spur-wheels G and H, which gear into the wheels E and F aforesaid, respectively, are arranged upon the shaft K loosely, so as to rotate independent of said shaft, except as hereinafter mentioned.

By means of the bevel-gearing upon the ends of the shafts, as shown, the revolution of the shaft K revolves the shaft L, which drives the pitman-rod M, connected with the sickle, and thus operates the same.

$a$ (shown in Fig. 3) represents a stop or projection upon the shaft K, and $b\ c$ respectively represent shoulders or catches upon the sides of the wheels G and H. By this arrangement, when either of said spur-wheels G H are adjusted laterally upon the shaft K, so that the projections $c$ or $b$ strike upon the stop $a$, the revolution of said spur-wheel will revolve the shaft K; but when moved back the spur-wheel will revolve without imparting motion to the said shaft. Thus when the wheel G, which is driven by the wheel E, is thrown upon the stop $a$, the shaft K is revolved more rapidly than when H, driven by F, is thrown upon said stop $a$.

The lateral adjustment of the spur-wheels G H upon the shaft K is effected by means of the levers I J, both wheels being thrown off from said stop $a$ and retained in such position when the braces $f\ g$ are fixed against them, and being thrown upon said stop by the action of the springs $h\ i$ when the braces $f\ g$ are released.

When the shaft K is being propelled by the wheel G it is not necessary that H should be thrown off from the stop $a$, as the more rapid revolution of G causes the shoulder $c$ to recede from the said stop $a$ in a retrograde motion; but when the shaft K is being driven by H care must be taken to throw the wheel G clear from the said stop $a$. Thus, by a proper adjustment of the gearing E G and F H, respectively, with respect to the size of wheels and their position upon K, the different velocities required under the circumstances above mentioned may be given to the sickle.

$l$ represents a belt or cord passing around the shaft or axle of the lever M, and also around the drum $m$, through a square hole in which the square rod $n$ passes and slides, to which rod $n$ is connected by a universal joint the reel-shaft O.

$r$ represents a slotted arm pivoted at its lower end to the frame A, so as to have a vertical movement about said pivot, being held firmly in place when adjusted by means of the screw $r'$, which slides in the slotted arc S.

Through the slot in $r$ the arm $p$ passes, which supports the shaft $n$ and reel, and is held and fastened in the desired position by the key $q$, as shown. By this arrangement the reel can be raised or lowered or moved forward or backward to any desired position, and the band $l$ always kept at the proper tension, the support R of the opposite end of the reel being provided with a series of holes wherein the reel may be adjusted as desired.

P represents a bent lever, having its fulcrum at $y$, by means of which, in connection with the rod $k$, the front edge of the sickle-bar may be raised up, when desired, to adapt the same to the unevenness of the ground.

W represents a wheel, which supports the rear part of the machine, which wheel is adjustable, so as to raise or lower the said rear part of the machine.

Having described my improvement in reapers and mowers, I will specify what I claim and desire to secure by Letters Patent:

1. The arrangement of the spur-wheels E F and adjustable pinions G H, when constructed and operating substantially as herein specified and shown.

2. The combination and arrangement of the spur-wheels E F, pinions G H, levers I J, and springs $h$ $i$, operating substantially as and for the purposes shown and described.

3. In combination with the above, the employment of the braces $f$ $g$, as and for the purposes specified and described.

4. The arrangement of the adjustable pinions G H, provided with the stops $b$ $c$, with the shaft K, provided with the projection $a$, operating substantially as specified and shown.

5. The combination of the slotted arm $r$, slotted arc S, support $p$, and key $q$, arranged and operating as specified and shown.

6. In combination with said adjustable support $p$, the arrangement of the drum $m$ and sliding bar $n$ and reel $o$, arranged and operating as specified.

HIRAM R. LAVEY.

Witnesses:
MELVINA A. LEVY,
KATE MORAN.